United States Patent [19]
Atwood

[11] Patent Number: 5,759,605
[45] Date of Patent: Jun. 2, 1998

[54] PRESSURE PLATE FACING ATTACHMENT FOR BAGEL FORMING MACHINE

[75] Inventor: Thomas A. Atwood, Dolton, Ill.

[73] Assignee: A.M. Manufacturing Company, Inc., Dolton, Ill.

[21] Appl. No.: 714,403

[22] Filed: Sep. 16, 1996

[51] Int. Cl.$^6$ ................................................. A21C 11/00
[52] U.S. Cl. .................. 426/517; 425/287; 425/364 B; 425/364 R; 425/403; 426/512; 426/514; 264/294
[58] Field of Search ................................. 264/294, 310; 425/287, 329, 364 B, 364 R, 308, 393, 403; 426/499, 512, 514, 517

[56] References Cited

U.S. PATENT DOCUMENTS

| | | |
|---|---|---|
| 4,038,988 | 8/1977 | Perisse . |
| 4,368,019 | 1/1983 | Thompson ........................ 425/141 |
| 4,478,565 | 10/1984 | Thompson ........................ 425/141 |
| 4,961,741 | 10/1990 | Hayhurst . |
| 5,084,058 | 1/1992 | Li . |
| 5,087,263 | 2/1992 | Li . |
| 5,100,415 | 3/1992 | Hayhurst . |
| 5,112,299 | 5/1992 | Pascaloff . |
| 5,133,723 | 7/1992 | Li et al. . |
| 5,163,946 | 11/1992 | Li . |
| 5,176,691 | 1/1993 | Pierce . |
| 5,192,287 | 3/1993 | Fournier et al. . |
| 5,217,471 | 6/1993 | Burkhart . |
| 5,234,444 | 8/1993 | Christoudias . |
| 5,269,791 | 12/1993 | Mayzels et al. . |
| 5,292,327 | 3/1994 | Dodd et al. . |
| 5,320,629 | 6/1994 | Noda et al. . |
| 5,324,298 | 6/1994 | Phillips et al. . |
| 5,334,200 | 8/1994 | Johnson . |
| 5,395,229 | 3/1995 | Atwood ........................ 425/364 B |
| 5,397,326 | 3/1995 | Mangum . |
| 5,403,330 | 4/1995 | Tuason . |
| 5,439,470 | 8/1995 | Li . |
| 5,549,618 | 8/1996 | Fleenor . |
| 5,562,684 | 10/1996 | Kammerer . |
| 5,571,117 | 11/1996 | Ahn . |
| 5,601,576 | 2/1997 | Garrison . |

FOREIGN PATENT DOCUMENTS 0706779  4/1996  European Pat. Off. .

OTHER PUBLICATIONS

"The Atwood Bagelformer Model BF-100, Operations and Safety Manual", A.M. Mfg. Inc. (1995), pp. 11 and 12.

*Primary Examiner*—Laurie Scheiner
*Attorney, Agent, or Firm*—Hill & Simpson

[57] ABSTRACT

A pressure plate facing fabric is secured to the pressure plate of a bagel forming machine. The fabric is positioned to form an acute angle with the circulating belt of the machine to avoid build-up of dough at the feed-in end of the machine.

13 Claims, 3 Drawing Sheets

5,759,605

1

PRESSURE PLATE FACING ATTACHMENT FOR BAGEL FORMING MACHINE

BACKGROUND OF THE INVENTION

This invention relates to a dough forming machine, and in particular to a bagel forming machine.

Machines for forming bagels are known. In a traditional such machine, a motor driven circulating looped belt is provided with a horizontal top surface. The belt is wrapped around an idler drum and a drive drum. At a first end of the machine, a pressure plate having a downward arcuate surface facing toward the belt is provided slightly elevated from the top surface of the belt. A dough guide plate is provided upstream of the pressure plate. When an incremental amount of dough is placed onto the belt, usually in the form of a small ball or short stick, the belt carries the dough beneath, but in engagement with, the pressure plate, which causes the incremental amount to roll about a lateral axis and elongate into a solid cylinder shape. At approximately the mid-span of the top surface of the belt is arranged a forming tube having an inside diameter approximating the outside diameter of the desired bagel shape. The forming tube has a cut-out at a top side thereof. A mandrel with an outside diameter approximating the diameter of the central hole of the bagel is mounted axially through the forming tube.

The lateral edges of the belt are wrapped upward into a circular shape corresponding to the inside diameter of the forming tube, guided into the forming tube by the cutout. The belt passes through the forming tube while in the circular shape and once it exits the forming tube, the belt flattens back down into a flat horizontal profile. Before returning to the first end of the assembly, the belt extends above a rotary table for receiving the finished product which drops off the belt. The rotary table could also be a further belt of other product receiving station.

The forming tube typically comprises two half circular sections with a seam located on a top side of the tube. The tube also provides a cutout at the top of the upstream axial end thereof. The cutout notch guides the lateral edges into the circular shape to pass into the forming tube. It is known from U.S. Pat. No. 5,395,229 to fixedly fasten an arcuate dough shield piece to partially cover a central area of the cutout and to guide excess dough into the circle formed by the belt wrapped into the tube.

The incremental amount of dough is pulled by the belt through the forming tube, where the elongated piece of dough wraps around the mandrel. The dough rolls between the belt and the mandrel into a uniform annular bagel shape with the portions of the dough piece which had been the free ends being pressed against one another so as to form a seamless circle by the time the dough reaches the end of the mandrel.

Another type of roll known as the bagel stick is formed of the same dough. A bagel stick is not shaped into a continuous circle, however. A bagel stick is elongated and generally straight. It is known from U.S. Pat. Nos. 3,862,818; 3,857,663; and U.S. Ser. No. 08/257,092, filed Jun. 7, 1994 to modify a traditional bagel forming machine so that it can also be used to produce bagel sticks or smaller pieces of dough.

At the first end of a dough forming machine, the dough guide plate attaches the pressure plate facing fabric directly to the feed end of the pressure plate. At the feed end of the pressure plate, the pressure plate facing fabric in the known machine forms an obtuse angle with the circulating belt.

The obtuse angle is undesirable, as it collects dough. Accumulations of dough at the feed end of the bagel forming machine can result in misshapen bagel sticks or undesirable globules of dough which can stick to the junction of the dough guide plate and pressure plate facing material. Such undesirable accumulations worsen as the obtuse angel continues to collect more dough causing downtime for the machine for cleaning requirements as well as the wasting of dough.

Therefore, it is desirable to provide an improved pressure plate facing fabric attachment which can be used to modify a traditional bagel forming machine. Furthermore, it is desirable to provide a pressure plate facing fabric attachment which overcomes problems associated with an obtuse angle at the mouth of the bagel forming machine.

SUMMARY OF THE INVENTION

It is an object of the present invention to provide a dough guide which can be installed on a known bagel forming machine which modifies the machine so that it avoids the build-up of dough at the feed-in end of the machine. To this end, in an embodiment, an improvement is provided to a dough roll forming machine having a flat circulating belt. The belt has a region wrapped into a circular cross section and threaded through a forming tube. The improvement is a pressure plate facing attachment ("the dough guide") which attaches to the pressure plate and pressure plate facing fabric at the feed end of the bagel forming machine. The dough guide allows the facing material to incrementally reduce the shape of a dough roll into an elongated stick.

In an embodiment, the pressure plate attachment has a face shaped to receive a bagel forming material ("the pressure plate facing fabric").

In an embodiment, an improvement is provided to a machine for forming rolled dough pieces. The machine has a flat belt circulating around two pulleys. The flat belt has a horizontal orientation on a top side thereof. The flat belt is under a pressure plate to reduce dough pieces to dough logs. The improvement is a pressure plate facing attachment at the feed end of the machine that incrementally reduces the dough piece into an elongated stick. The pressure plate attaches to the facing fabric.

Additional features and advantages of the present invention are described in, and will be apparent from, the detailed description of the presently preferred embodiments and from the drawings.

DESCRIPTION OF THE PREFERRED EMBODIMENTS

Figure 1:
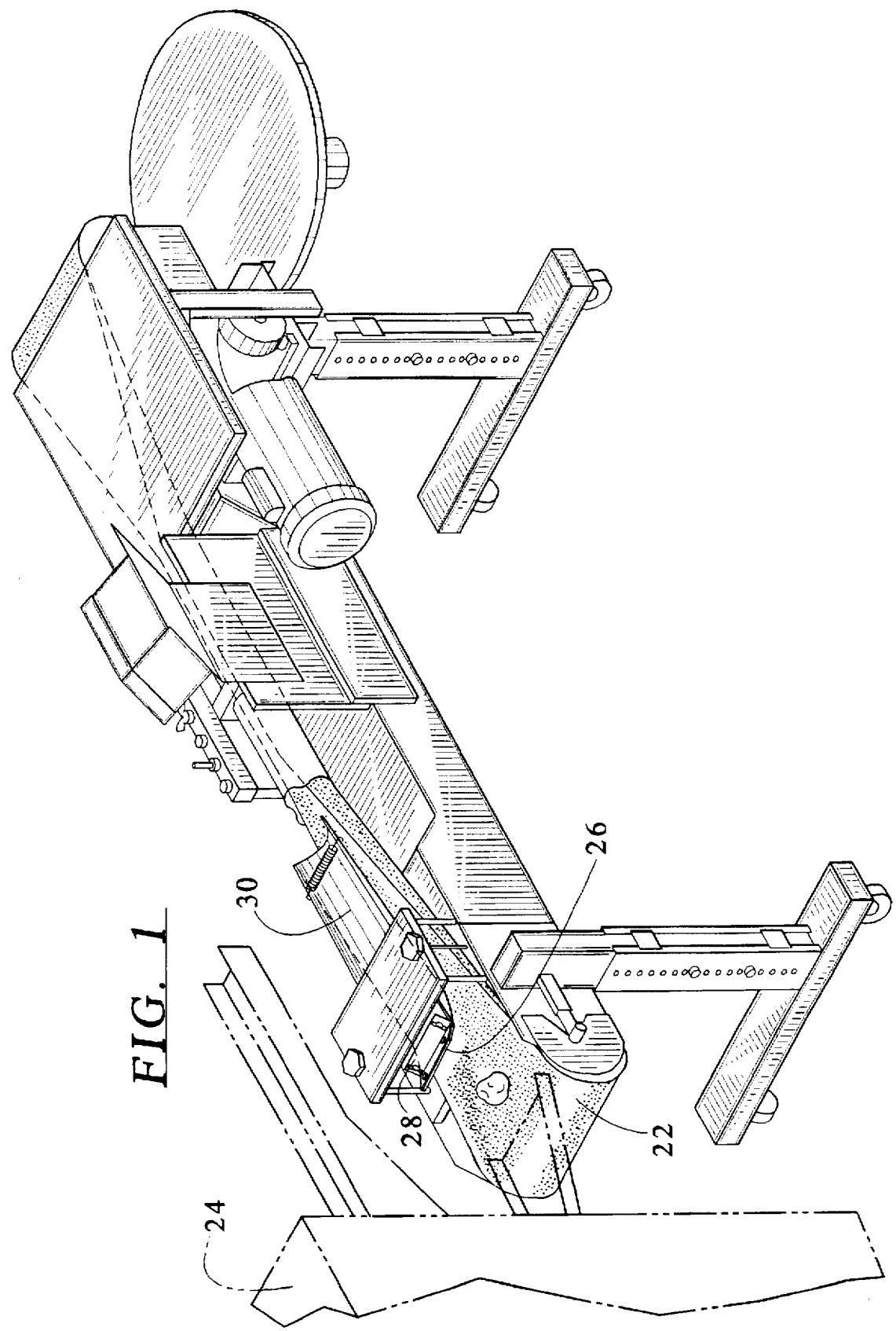
FIG. 1 is a perspective view of the bagel forming machine from the feed end.

In accordance with the invention described, with reference to the accompanying figures, wherein like numerals designate like parts, a dough forming machine is illustrated in FIG. 1. The dough forming machine 20 has a circulating belt 22. The circulating belt 22 carries dough balls from a dispenser 24 to a pressure plate facing fabric 26. The pressure plate facing fabric 26 is attached to a dough guide 28 and a pressure plate 30.

Figure 2:
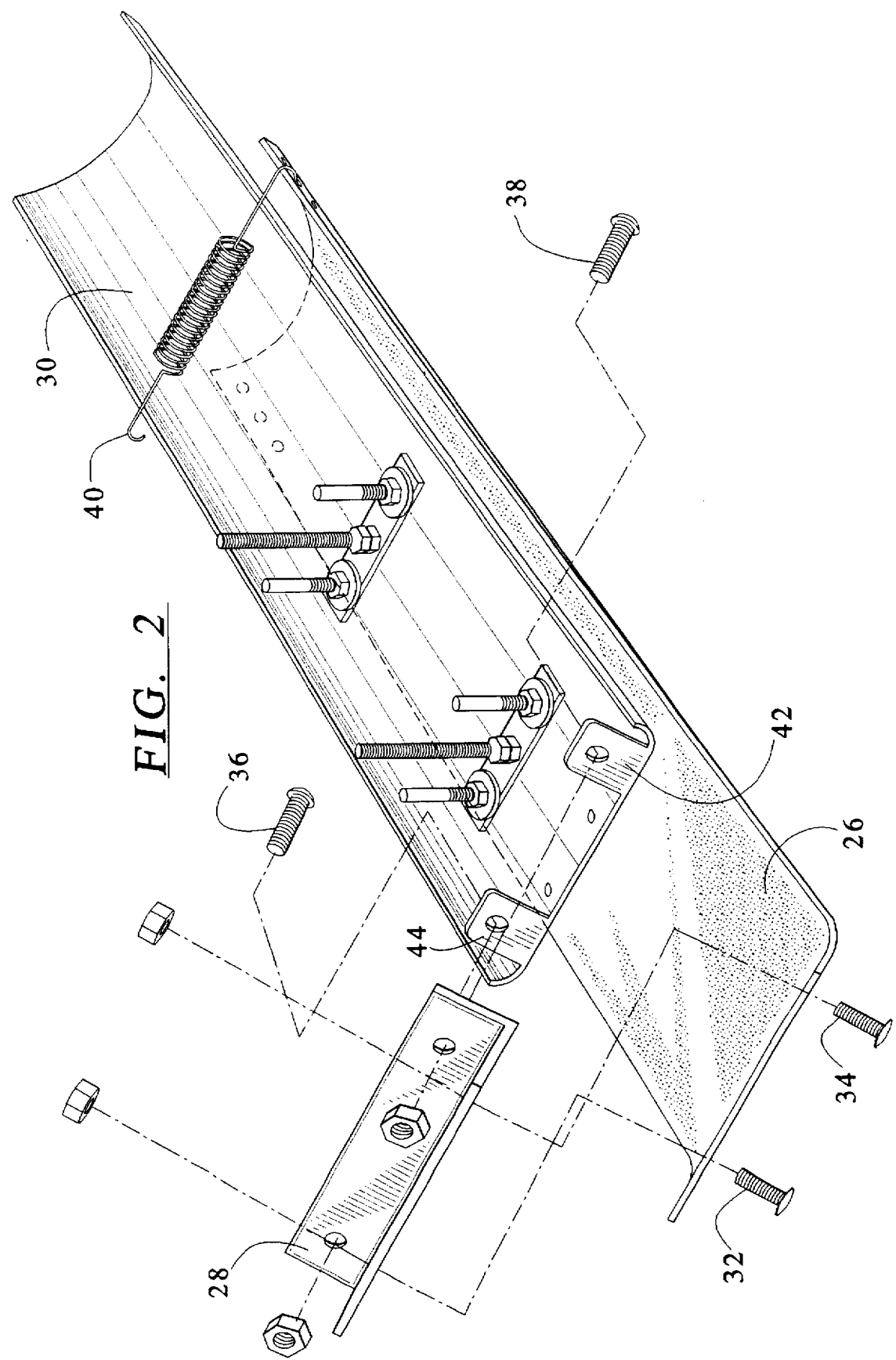
FIG. 2 is a close up perspective view of the pressure plate area of the bagel forming machine.
Figure 5:
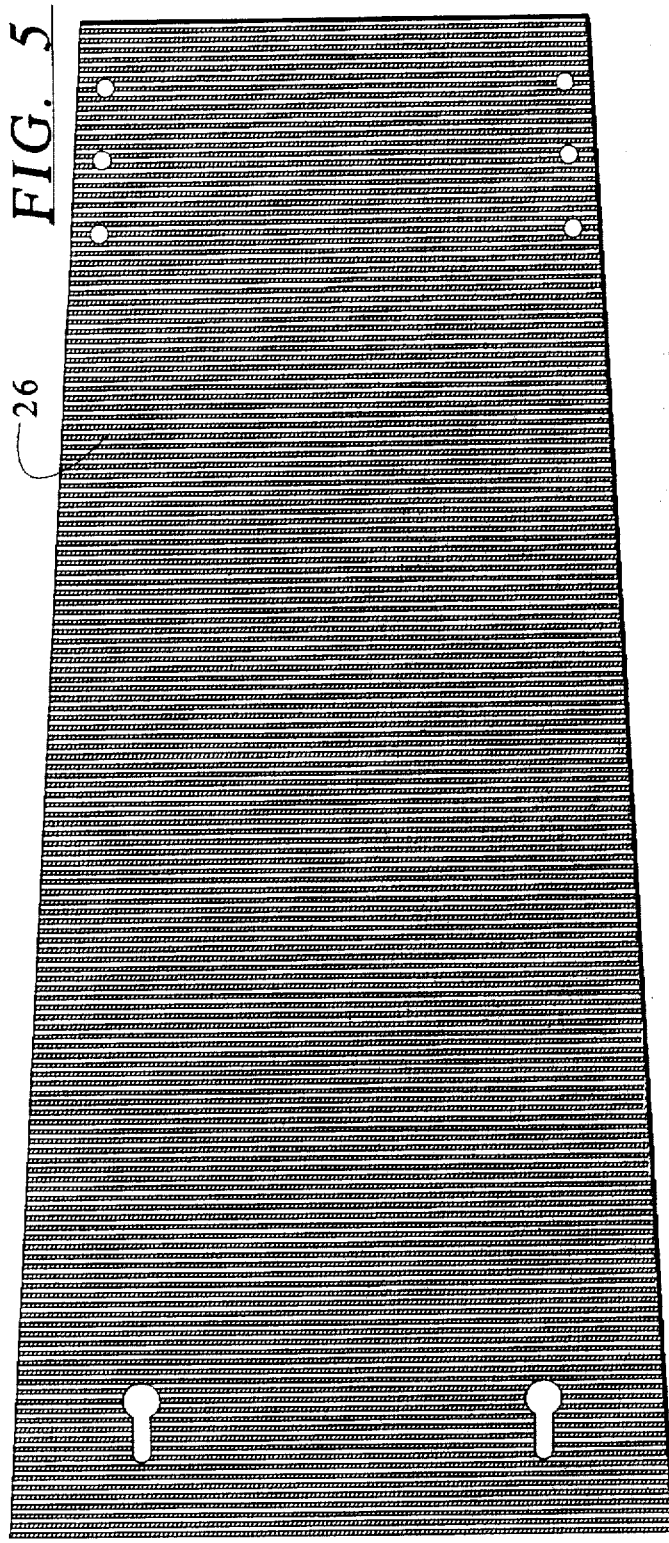
FIG. 5 is a flat, top view of the pressure plate facing fabric.

FIG. 2 shows the invention in a disassembled state. The pressure plate facing fabric 26 attaches to the dough guide 28 and the pressure plate 30. The pressure plate facing fabric 26 is connected to the dough guide 28 by two fixed screws 32, 34. In addition, the pressure plate facing fabric 26 is fixed to the pressure plate 30 by a spring loaded attachment 40.

The dough guide 28 mounts on two tabs 42, 44 of the pressure plate 30, by the use of two fixed screws 36, 38.

Figure 3:
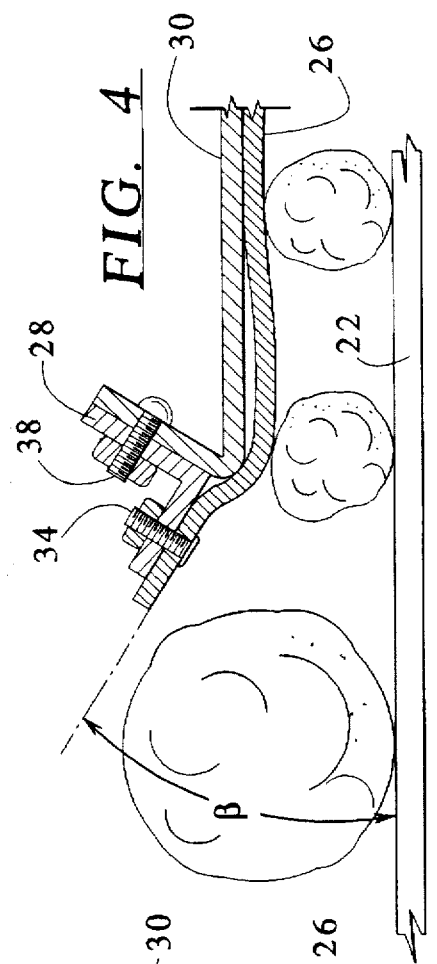
FIG. 3 is a side view of the prior art.

FIG. 3 illustrates the problems that occurred with the prior art. Here, the pressure plate facing fabric 26 was connected directly to the pressure plate 30 by a plate 46 and a fixed screw 48. The pressure plate facing fabric 26 is attached to form an obtuse angle a with the circulating belt 22.

This prior art embodiment resulted in the pressure plate facing fabric 26 bowing away from the pressure plate 30. As a large piece of dough comes into contact with this embodiment, globules of dough affixed to the junction of the plate 46 and the pressure plate facing fabric 26. This undesirable result causes misshapen dough logs. In turn, as a dough piece is drawn under the pressure plate the "bowing effect" of the fabric 26 dramatically presses against the dough piece and then releases the dough piece. The dough piece undesirably loses contact with the fabric 26. This, too, results in misshapen dough logs and inconsistent spacing between dough logs causing further manufacturing problems with the dough forming machine 20.

Figure 4:
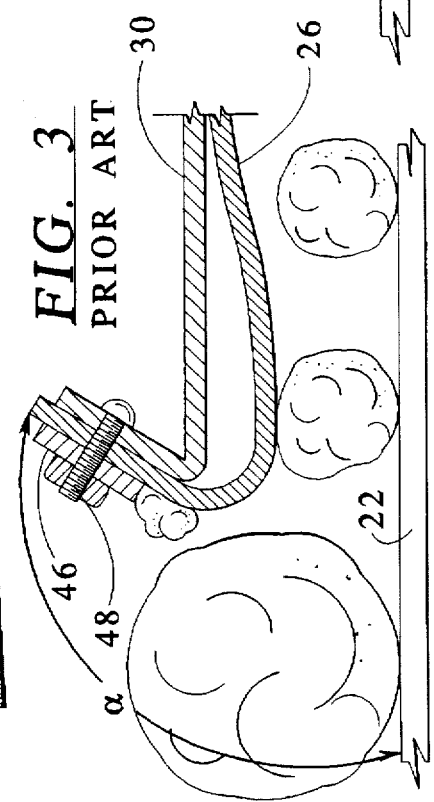
FIG. 4 is a side view of the invention.

The present invention shown in FIG. 4 is an improvement over the prior art embodiment described above in FIG. 3. In the present invention, the pressure plate facing fabric 26 is attached to form an acute angle β with the circulating belt 22. As a result, the dough pieces are gradually fed under the pressure plate 30 and no dough globules are allowed to form because the junction was eliminated.

This acute angle β can be provided by mounting one leg of a v-shaped dough guide 28 onto the pressure plate 30. The fabric 26 is then mounted to the second leg of the v-shaped dough guide. Thus, the fabric 26 may extend beyond the second leg of the dough guide providing the acute angle β. This acute angle β allows for the fabric to lie directly among the pressure plate 30 without producing a bowing effect away from the pressure plate 30. The acute angle β uniformly guides the dough pieces under the pressure plate 30. The dough pieces remain in contact with the pressure plate facing fabric 26 as they are gradually reduced to dough logs.

The acute angle β can also be achieved by providing the mounting tabs 42,44 at the acute angle β and attaching the fabric 26 directly to the tabs 42, 44. While the previously described embodiment will be useful for retro fit installation on existing pressure plates 30, this second embodiment will be useful for new construction.

Although modifications and changes may be suggested by those skilled in the art, it is the intention of the inventor to embody within the patent warranted hereon all changes and modifications as reasonably and properly come within the scope of his contribution to the art.

I claim as my invention:

1. A roll forming machine for shaping dough pieces wherein said machine has a flat circulating belt for carrying said dough pieces with a region of said belt drawn under a pressure plate having at least one tab at a feed end, the improvement comprising:

a v-shaped dough guide having a first leg and a second leg;

a pressure plate facing fabric;

a first mounting device, the first leg secured to the tab via the first mounting device; and a second mounting device, the second leg secured to the pressure plate facing fabric via the second mounting device so that the pressure plate facing fabric at the feed end forms an acute angle with the circulating belt and is longitudinally aligned with the pressure plate.

2. The improvement according to claim 1, wherein the first and second legs of the v-shaped dough guide form a 90 degree angle.

3. The improvement according to claim 1, wherein at least one tab comprises two tabs.

4. The improvement in claim 3, wherein the first leg of the v-shaped dough guide has two mounting holes in which each mounting hole is cooperatively aligned with the two tabs of the pressure plate.

5. The improvement in claim 4, wherein said first mounting device is two fixed screws connected via the two mounting holes on the first leg and the two tabs of the pressure plate.

6. The improvement in claim 1, further comprising:

two mounting holes on the second leg of the v-shaped dough guide and each mounting hole is cooperatively aligned with a hole in the at least one tab and with the pressure plate facing fabric.

7. The improvement in claim 6, wherein said second mounting device is two fixed screws connected via the two mounting holes on the second leg and the two tabs of the pressure plate.

8. A pressure plate facing attachment for shaping dough pieces in a roll forming machine comprising:

a pressure plate with a feed end; and a pressure plate facing fabric secured to the pressure plate such that the pressure plate facing fabric forms an acute angle at the feed end with the circulating belt and is longitudinally aligned with and connected to the pressure plate.

9. A pressure plate facing attachment in claim 8, further comprising:

a v-shaped dough guide having a first leg and a second leg; and the first leg is fixed to the pressure plate and the second leg is fixed to the pressure plate facing fabric.

10. A method for shaping dough pieces which comprises:

providing a pressure plate having a feed end;

providing a circulating belt for carrying the dough pieces;

providing a pressure plate facing fabric on the underside of the pressure plate;

mounting the pressure plate facing fabric so as to provide an acute angle with the circulating belt at the feed end of the pressure plate;

placing the dough pieces on the circulating belt;

moving the dough pieces under the pressure plate facing fabric;

continuously contacting the dough pieces with the pressure plate facing fabric as the dough pieces move under the pressure plate; and reducing the dough pieces to dough logs.

11. The method in claim 10, wherein the step of providing a pressure plate facing fabric on the underside of the pressure plate further includes:

mounting the pressure plate facing fabric so as to provide an acute angle with the circulating belt at the feed end of the pressure plate.

12. The method in claim 10, wherein the step of providing a pressure plate having a feed end further includes:

providing a pressure plate having at least one tab.

13. A roll forming machine for shaping dough pieces wherein said machine has a flat circulating belt for carrying said dough pieces with a region of said belt drawn under a pressure plate, the improvement comprising:

a mounting mechanism; and a pressure plate facing fabric, the pressure plate facing fabric secured to the pressure plate via the mounting mechanism so that the pressure plate facing fabric at the feed end forms an acute angle with the flat circulating belt and is longitudinally aligned with the pressure plate.

* * * * *